United States Patent
Hwang et al.

(10) Patent No.: US 10,470,087 B2
(45) Date of Patent: Nov. 5, 2019

(54) METHOD, DEVICE, SYSTEM AND SOFTWARE PRODUCT FOR PROVIDING SYSTEM INFORMATION TO ENABLE PACKET SWITCHED HANDOVER

(71) Applicants: Woohee Hwang, Espoo (FI); Olivier Guyot, Taipei (TW); Antti O. Kangas, Oulunsalo (FI)

(72) Inventors: Woohee Hwang, Espoo (FI); Olivier Guyot, Taipei (TW); Antti O. Kangas, Oulunsalo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 105 days.

(21) Appl. No.: 15/018,659

(22) Filed: Feb. 8, 2016

(65) Prior Publication Data

US 2016/0157141 A1 Jun. 2, 2016

Related U.S. Application Data

(63) Continuation of application No. 13/615,435, filed on Sep. 13, 2012, now abandoned, which is a continuation of application No. 11/540,940, filed on Sep. 28, 2006, now Pat. No. 9,301,228.

(60) Provisional application No. 60/721,681, filed on Sep. 29, 2005.

(51) Int. Cl.
*H04W 36/00* (2009.01)
*H04W 8/20* (2009.01)
*H04W 36/10* (2009.01)

(52) U.S. Cl.
CPC ......... *H04W 36/0055* (2013.01); *H04W 8/20* (2013.01); *H04W 36/10* (2013.01)

(58) Field of Classification Search
CPC . H04Q 2/20; H04Q 7/20; H04W 8/20; H04W 36/00; H04W 36/10; H04W 36/0055; H04W 36/0061
See application file for complete search history.

(56) References Cited

U.S. PATENT DOCUMENTS

| | | | |
|---|---|---|---|
| 6,546,251 B1 | 4/2003 | Dalsgaard et al. | |
| 6,725,039 B1 | 4/2004 | Parmar et al. | |

(Continued)

FOREIGN PATENT DOCUMENTS

| | | |
|---|---|---|
| EP | 1 056 259 | 11/2000 |
| JP | 2000-358267 | 12/2000 |

(Continued)

OTHER PUBLICATIONS

Erickson, "Inclusion of Inter-RAT PS Handover between UTRAN and GERAN A/Gb", 3GPP Draft; R3-050111, Feb. 9, 2005, XP050157586.
3GPP TS 48.018 v6.14.0 (Jul. 2006); $3^{rd}$ Generation Partnership Project; Technical Specification Group GSM/EDGE Radio Access Network; General Packet Radio.
(Continued)

*Primary Examiner* — Jung H Park
(74) *Attorney, Agent, or Firm* — Cozen O'Connor

(57) ABSTRACT

Providing an indication whether a source radio network controller requests to receive system information from a handover target. Receiving the system information in a target to source transparent container, if the indication requests to receive the system information, and not receiving the system information in the target to source transparent container without the indication requesting to receive system information.

16 Claims, 8 Drawing Sheets

(56) References Cited

U.S. PATENT DOCUMENTS

| | | | |
|---|---|---|---|
| 6,792,284 B1* | 9/2004 | Dalsgaard | H04W 36/0094 370/331 |
| 6,807,419 B1 | 10/2004 | Laiho et al. | |
| 7,058,406 B1 | 6/2006 | Lundell et al. | |
| 7,072,656 B2* | 7/2006 | Willars | H04W 36/0061 370/331 |
| 7,782,818 B2 | 8/2010 | Hurtta et al. | |
| 2002/0137522 A1* | 9/2002 | Landais | H04W 36/02 455/455 |
| 2003/0013443 A1 | 1/2003 | Willars et al. | |
| 2003/0119507 A1 | 6/2003 | Semoer | |
| 2004/0077348 A1 | 4/2004 | Sebire et al. | |
| 2004/0137876 A1 | 7/2004 | Fischer et al. | |
| 2005/0026616 A1* | 2/2005 | Cavalli | H04W 36/0083 455/436 |
| 2005/0090270 A1 | 4/2005 | Jou et al. | |
| 2005/0119004 A1 | 6/2005 | Gao et al. | |
| 2005/0243870 A1 | 11/2005 | Balogh et al. | |
| 2006/0035645 A1* | 2/2006 | Kim | H04W 36/10 455/452.1 |
| 2006/0280144 A1 | 12/2006 | Kangas | |
| 2006/0291416 A1* | 12/2006 | Rexhepi | H04W 36/12 370/331 |
| 2007/0010252 A1* | 1/2007 | Balachandran | H04W 36/0033 455/437 |
| 2007/0070949 A1 | 3/2007 | Hwang et al. | |
| 2013/0003705 A1 | 1/2013 | Hwang et al. | |

FOREIGN PATENT DOCUMENTS

| | | |
|---|---|---|
| JP | 2002-525938 | 8/2002 |
| JP | 2002-528977 | 9/2002 |
| JP | 2002-543723 | 12/2002 |
| JP | 2003-515998 | 5/2003 |
| JP | 2003-534714 | 11/2003 |
| JP | 2004-523158 | 7/2004 |
| WO | WO 00/79808 | 12/2000 |
| WO | WO 01/30107 | 4/2001 |
| WO | WO 2001/030107 | 4/2001 |
| WO | WO 03/075591 | 9/2003 |
| WO | WO 2005027561 A1 | 3/2005 |
| WO | WO 2005/050957 | 6/2005 |
| WO | WO 2005/083912 | 9/2005 |
| WO | WO 2005/089002 | 9/2005 |

OTHER PUBLICATIONS

3GPP TS 25.413 v6.6.0 (Jun. 2005); 3$^{rd}$ Generation Partnership Project; Technical Specification Group Radio Access Network; UTRAN Iu Internace RANAP Signalling (Release 6).

Japanese Patent Office; Masayuki Takahashi; "Notice of Reasons for Rejection"; whole document; dated Nov. 30, 2010; with English translation.

3GPP TSG-RAN WG3 #41 BIS, Tdoc R3-040630; Samsung; "Channel Type Indication considering CELL DCH UEs"; whole document; Mar. 30, 2004.

3GPP TS 48.018 V6.9.0 (Jul. 2005); "3'd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP)(Release 6)"; p. 52-58, 104-148; Jul. 2005.

Maohua Wang; State Intellectual Property Office of the People's Republic of China, "Notification of 3 rd Office Action"; whole document; dated Feb. 13, 2012; with English translation.

TSG-RAN Working Group 3 meeting #46; "Draft Report of 3GPP TSG RAN WG3 meeting #46"; Scottsdale, USA, Feb. 14-18, 2005; published Feb. 23, 2005; pp. 1-33.

3GPP TSG-RAN WG3 Meeting #46, Scottsdale, USA, Feb. 14-18, 2005.

Digital cellular telecommunications system (Phase 2+); General Packet Radio Service (GPRS); Base Station System (BSS)—Serving GPRS Support Node (SGSN); BSS GPRS Protocol (3GPP TS 48.018 version 6.9.0 Release 6) (ETSI TS 148 018 V6.9.0 (Jul. 2005)).

RAN2, LS on RIM Procedure Re-use for PS Handover, 3GPP TSG-RAN WG2#48, R2-052326, Aug. 29, 2005.

Nokia, PSI/SI Information Transfer to Source BSS During Inter-BSS or Inter-RAT PS Handover, 3GPP TSG GERAN2 #26bis, G2-050404, Oct. 3, 2005.

Office Action dated Apr. 21, 2014 issued in the corresponding Japanese Patent Application No. 2013-216669.

3GPP TSG-RAN Meeting #16 Tdoc RP-020454, Jun. 2002, pp. 14-22.

Ericsson et al. "PS handover to/from GERAN", 3GPP Draft; R2-052020, Aug. 24, 2005, XP050129155, 18 pages.

RAN2 "Draft Proposed LS on RIM procedure re-use for PS Handover", 3GPP Draft; R2-052305, Sep. 5, 2005, XP050602598, 1 page.

LS on RIM procedure re-use for PS Handover (3GPP TSG-RAN WG2 #48, London, Aug. 29-Sep. 2, 2005, Release 6).

* cited by examiner

The coding of this element is described in 3GPP TS 48.018.

| IE/Group Name | Presence | Range | IE type and reference | Semantics description |
|---|---|---|---|---|
| Source BSS to Target BSS Transparent Container | M | | OCTET STRING | Coded as the value (V) part of the *Source BSS to Target BSS Transparent Container* IE defined in [36]. |
| PSI_SI Indicator | O | | Boolean | "TRUE" means SRNC needs PSI/SI transferred in the Target BSS to Source BSS Transparent Container. |

FIG. 1

The coding of this element is described in 3GPP TS 48.018.

| IE/Group Name | Presence | Range | IE type and reference | Semantics description |
|---|---|---|---|---|
| PS HO Command Transparent Container | M | | OCTET STRING | Coded as the value (V) part of the *PS HO Command Transparent Container* IE defined in [36]. |
| PSI_SI Transparent Container | O | | OCTET STRING | Coded as the value (V) part of the *PSI_SI Transparent Container* IE defined in [36]. |

FIG. 2

|  | 8 | 7 | 6 | 5 | 4 | 3 | 2 | 1 |
|---|---|---|---|---|---|---|---|---|
| Octet 1 | IEI | | | | | | | |
| Octet 2 2a | Length Indicator | | | | | | | |
| Octet 3-? | Rest of element coded as a complete PS Handover Command radio interface message as defined in 3GPP TS 44.060 (carrying the *PS Handover to A/Gb Mode Payload*) | | | | | | | |
| Octet ?+1-?? | RAN-INFORMATION Application Container for the NACC Application/11.3.63.2.1 | | | | | | | |

FIG. 3

| | 8 | 7 | 6 | 5 | 4 | 3 | 2 | 1 |
|---|---|---|---|---|---|---|---|---|
| Octet 1 | IEI | | | | | | | |
| Octet 2, 2a | Length Indicator | | | | | | | |
| Octet 3-10 | Reporting Cell Identifier | | | | | | | |
| Octet 11 | Number of SI/PSI | | | | | | | Type |
| Octet 12-n | SI/PSI | | | | | | | |

FIG. 4a

| Coding | Semantic |
|---|---|
| 0 | SI messages as specified for BCCH (3GPP TS 44.018) follow |
| 1 | PSI messages as specified for PBCCH (3GPP TS 44.060) follow |

FIG. 4b

| Coding | Semantic |
|---|---|
| 000 0000 | 0 "SI/PSI" follows |
| 000 0001 | 1 "SI/PSI" follow |
| , | " |
| 111 1111 | 127 "SI/PSI" follow |

FIG. 4c

The coding of this element is described in [36].

| IE/Group Name | Presence | Range | IE type and reference | Semantics description |
|---|---|---|---|---|
| Number of containers | M | | INTEGER(2..11) | Coded as the value (V) part of the *PS HO Command Transparent Container* IE defined in [36]. |
| Target BSS to Source BSS Transparent Container | | 1 to <MaxNumOfContainer> | OCTET STRING | Coded as the value (V) part of the *Target BSS to Source BSS Transparent Container* IE defined in [36]. |

FIG. 5

| | 8 | 7 | 6 | 5 | 4 | 3 | 2 | 1 |
|---|---|---|---|---|---|---|---|---|
| Octet 1 | IEI | | | | | | | |
| Octet 2 2a | Length Indicator | | | | | | | |
| Octet 3 | Number of Containers | | | | | | | |
| Octet 4-? | Rest of element coded as a complete PS Handover Command radio interface message as defined in 3GPP TS 44.060 (carrying the *PS Handover to A/Gb Mode Payload*) | | | | | | | |
| Octet ?+1-?? | SI/PSI | | | | | | | |

FIG. 6

METHOD, DEVICE, SYSTEM AND SOFTWARE PRODUCT FOR PROVIDING SYSTEM INFORMATION TO ENABLE PACKET SWITCHED HANDOVER

CROSS REFERENCE TO RELATED APPLICATIONS

This application is a continuation of U.S. patent application Ser. No. 13/615,435 which was filed with the U.S. Patent and Trademark Office on Sep. 13, 2012 and Ser. No. 11/540,940 which was filed with the U.S. Patent and Trademark Office on Sep. 28, 2006, now U.S. Pat. No. 9,301,228. This application claims the benefit of U.S. Provisional Application No. 60/721,681, filed Sep. 29, 2005.

BACKGROUND OF THE INVENTION

Field of the Invention

The invention relates to wireless telecommunications, and more particularly to handover situations in a wireless telecommunications system.

Description of the Related Art

The global system for mobile communications (GSM) was designed as a second generation system for enabling voice communication to go wireless. However, customers have increasingly sought additional wireless services, such as text messaging and access to data networks. Therefore, third generation systems are designed to provide multimedia communication, including images and video. For example, enhanced data rates for GSM evolution (EDGE) can provide third generation services, including advanced features that improve spectrum efficiency. Likewise, the universal mobile telecommunications services (UMTS) provides flexible delivery of many different services. The UMTS terrestrial radio access network (UTRAN) includes network elements that handle radio-related functionality for UMTS.

By definition, handover means transfer of a user connection from one radio channel to another. One type of handover is an inter-RAT handover, when a user equipment (UE) moves to a different radio access technology (RAT). For example, when the user equipment (UE) reaches the end of a coverage area for UMTS services, it can handover to a 2G service like GSM (if the UE supports multiple RAT). An inter-RAT handover procedure can be initiated in a variety of ways. For instance, a radio network subsystem (RNS) might send a command explicitly telling the UE to move to a different RAT, or the UE might select a cell that belongs to a different RAT.

In the context of a general packet radio system (GPRS), rules for packet switched (PS) handover have been defined in Release 6 of the Third Generation Partnership Project (3GPP), based on GSM/EDGE Radio Access Network (GERAN) research and development. To support handover between radio access technologies (i.e. to support inter-RAT handovers), such as handovers between UMTS and GSM, signalling has been added in the radio resource control (RRC) with the Uu interface, and in the radio access network application part (RANAP) with the Iu interface. Pertinent details about GPRS can be found in 3GPP TS 48.018 V 6.14.0 (2006-07), "BSS GPRS Protocol (BSSGP) (Release 6)," of which pages 52-58 and 106-150 are incorporated by reference herein in their entirety. Also, pertinent details about RANAP signalling can be found in 3GPP TS 25.413 V 6.0.0 (2005-06), "UTRAN Iu interface RANAP signalling (Release 6)," of which pages 33-37 and 122-170 are incorporated by reference herein in their entirety.

To support inter-RAT PS handover from UTRAN to GERAN, a serving radio network controller (SRNC) needs system information such as packet system information (PSI/SI which is the same as SI/PSI) blocks of the target GERAN cell. The 3GPP group known as "RAN2" has added a choice structure information element (IE) in RRC handover from the UTRAN command message, in order to transfer these PSI/SI blocks to the user equipment (UE). The assumption about how the SRNC gets these blocks was to reuse a RAN Information Management (RIM) procedure with Network Assisted Cell Change (NACC).

Problematically, the RIM/NACC procedure is optional in the network. Consequently, there is no guarantee that the SRNC will get the PSI/SI blocks in time for the handover. In the UMTS network, the SRNC may have to get the PSI/SI blocks from a drift radio network controller (DRNC) or controlling RNC (CRNC). Thus, the procedure may be even more complicated, more problematic, and less likely to provide the SRNC with the PSI/SI blocks in time.

The PSI/SI blocks are mandatory information for PS handover, whereas RIM/NACC is an optional feature for optimization. Thus, the criticality of missing PSI/SI blocks is higher in the PS handover than in the RIM/NACC procedure.

SUMMARY OF THE INVENTION

The problem described above can be solved by including PSI/SI blocks in a transparent container from the target base station subsystem (BSS) to the source base station subsystem (BSS) or source RNC. In order to optimize this procedure, a PSI/SI indicator can also be included in a source BSS to target BSS transparent container, for example with a value indicating if the PSI/SI block is required in return.

As a person skilled in the art knows, a transparent container is an information element that often contains information needed to perform relocation. Relocation is the procedure by which a target RNC or BSS may become a mobile terminal's new serving RNC or BSS, respectively. The transparent container can include, for example, security information regarding the mobile, and/or can include the protocol context that describes the mobile's RRC connection and the mobile's capabilities. A transparent container carries information to an intermediate node, such as a serving GPRS support node (SGSN), so that the intermediate node can copy the contents of the container into a message to the final destination (e.g. to a target node). The present invention involves using the transparent container to convey PSI/SI blocks between a target subsystem and a source subsystem, so as to facilitate PS handover.

In case the SRNC and CRNC are the same RNC, and the CRNC implements RIM/NACC, then the SRNC can indicate that it does not need to receive PSI/SI blocks in the target BSS to source BSS transparent container, because the SRNC would already have the PSI/SI blocks. In this case, absence of a PSI/SI indicator IE in the source BSS to target BSS transparent container IE, or a PSI/SI Indicator with a proper value depending on the type of IE, means that the target BSS has to send the PSI/SI blocks.

Alternatively, the SRNC can indicate that it needs to receive the PSI/SI blocks in the target BSS to source BSS transparent container. In this case, absence of PSI/SI Indicator IE in the source BSS to target BSS transparent container IE, or the PSI/SI Indicator with a proper value, means that the target BSS shall not send the PSI/SI blocks. This PSI/SI indicator IE does not need to be in the source BSS to target BSS transparent container, but it shall be transferred from the source RNC to the target BSS via proper messages. By this mechanism, the SRNC can avoid unnecessary PSI/SI delivery over Iu and Gb interfaces.

It is important to ensure that the SRNC will get all the necessary information for PS handover from the target BSS in case of UTRAN to GERAN PS handover. With the present invention, the SRNC will receive PSI/SI blocks in addition to a PS handover command message, in the target BSS to source BSS transparent container.

One drawback of adding PSI/SI blocks in the target BSS to source BSS transparent container may be in case the SRNC is the same as the CRNC, and the CRNC implements a RIM/NACC procedure. As mentioned, it would be a waste to transfer PSI/SI blocks in the transparent container, because the SRNC would have these blocks. To avoid this situation, the present invention includes a way for the SRNC to indicate whether it needs PSI/SI blocks in the source BSS to target BSS transparent container. With this indication, it becomes possible to avoid unnecessary delivery of PSI/SI blocks from the target BSS to the source RNC.

This present invention can be used not only for inter-RAT PS handover, but also for inter-BSS PS handover as well. This is because the RIM/NACC procedure is optional in the GSM network as well.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1 shows an implementation of PSI/SI indicator, according to the present invention.

FIG. 2 shows a change to 3GPP TS 25.413, section 9.2.1, describing a target BSS to source BSS transparent container, according to a first version of an embodiment of the present invention.

FIG. 3 shows a change to 3GPP TS 48.018, Table 11.3.80.a, describing a target BSS to source BSS transparent container coding, according to the first version of an embodiment of the present invention.

FIG. 4a shows a change to 3GPP TS 48.018, Section 11.3.63.2.1, Table 11.3.63.2.1 a, according to the first version of an embodiment of the present invention.

FIG. 4b shows a change to 3GPP TS 48.018, Section 11.3.63.2.1, Table 11.3.63.2.1b, according to the first version of an embodiment of the present invention.

FIG. 4c shows a change to 3GPP TS 48.018, Section 11.3.63.2.1, Table 11.3.63.2.1c, according to the first version of an embodiment of the present invention.

FIG. 5 shows a change to 3GPP TS 25.413, section 9.2.1, describing a target BSS to source BSS transparent container, according to a second version of an embodiment of the present invention.

FIG. 6 shows another change to 3GPP TS 48.018, Table 11.3.80.a, describing a target BSS to source BSS transparent container coding, according to the second solution of the present invention.

DETAILED DESCRIPTION OF THE PRESENTLY PREFERRED EMBODIMENTS

Figure 7:
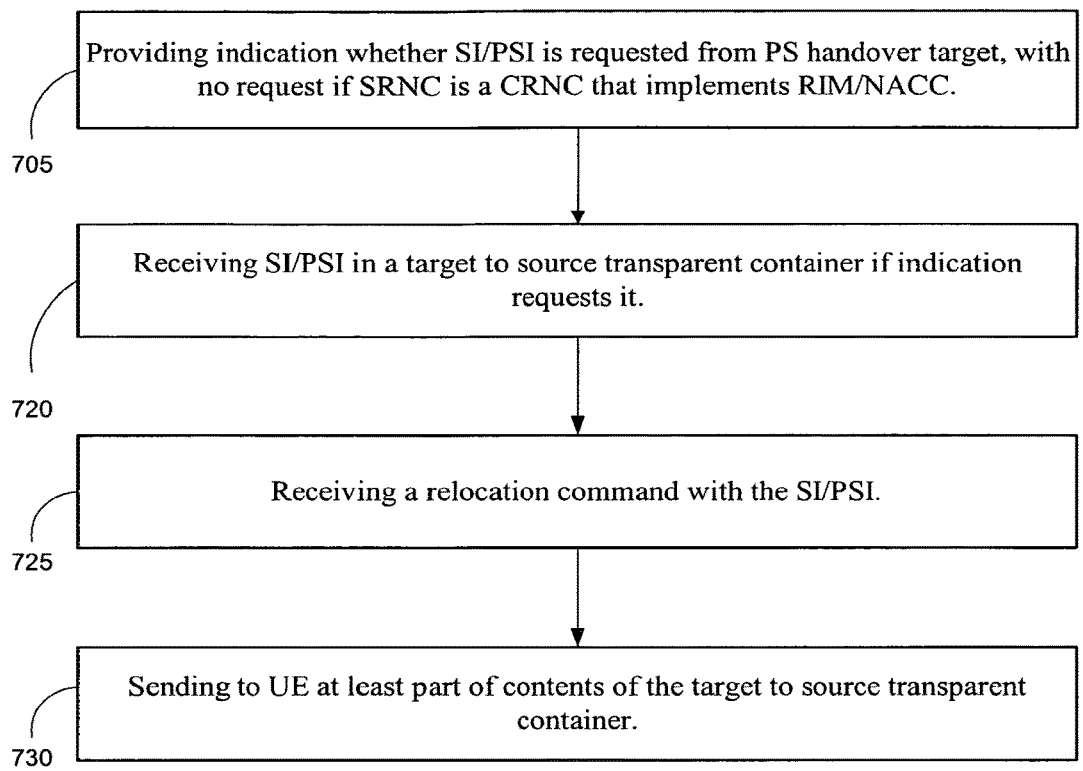
FIG. 7 is a flow chart showing a method according to an embodiment of the present invention.

A preferred embodiment of the present invention will now be described, merely to illustrate one way of implementing the invention. This illustration is not meant to limit the scope or coverage of what is described elsewhere in this application.

As explained above, for PS handover, PSI/SI blocks are mandatory information. They must be transferred to the UE before a PS HANDOVER COMMAND message is transferred.

An assumption for a UTRAN to GERAN PS handover case has been that PSI/SI blocks in addition to PS HANDOVER (HO) COMMAND message are included in the HANDOVER FROM UTRAN COMMAND message. To construct this RRC message, the SRNC has to receive the necessary GERAN information. The PS HANDOVER COMMAND message can be included in a target BSS to source BSS transparent container. However, PSI/SI blocks are assumed to be delivered to the SRNC via a RIM/NACC procedure.

The current mandatory procedure for PS handover implicates RIM/NACC, whereas the RIM/NACC procedure is optional in network implementation, according to 3GPP specifications. Thus, according to 3GPP specifications, the SRNC is not guaranteed to receive PSI/SI blocks in time for PS handover, and the SRNC must either delay the PS handover or have a failed PS handover, if the SRNC is the same as the CRNC which did not implement RIM/NACC procedure, or if the SRNC is different from the CRNC which did not implement RIM/NACC procedure.

Accordingly one embodiment of the present invention is a transparent container solution. An optimization for this transparent container solution can be to include a PSI/SI Indicator IE in a source BSS to target BSS transparent container. If the SRNC and the CRNC are the same RNC, and the CRNC implemented RIM/NACC, the SRNC will not need to receive PSI/SI blocks again via a target BSS to source BSS transparent container. So, if the SRNC has PSI/SI blocks for the target GSM cell, the SRNC will not include the PSI/SI Indicator IE. If the SRNC needs to receive PSI/SI blocks via target BSS to source BSS transparent container, it will include the PSI/SI Indicator IE with the value "True". If the target BSS receives this indicator, it includes the PSI/SIs blocks in the target to source BSS transparent container.

One illustrative implementation of the PSI/SI Indicator is shown in FIG. 1. If the PSI_SI Indicator IE is missing, it means the SRNC does not need to receive PSI/SI blocks. But the meaning of existence of IE can be the other way around; i.e., a missing PSI/SI Indicator IE can mean that the SRNC needs PSI/SI blocks.

Another illustrative implementation of the PSI/SI Indicator is to make the PSI/SI Indicator a mandatory IE. Thus, this PSI/SI Indicator will always be included in the source BSS to target BSS transparent container, and the source RNC/BSS must indicate clearly whether it needs PSI/SI blocks or not. The implementation details can vary to realize PSI/SI Indicator. The importance is that there should be a means for the source RNC/BSS to indicate whether it needs to receive PSI/SI blocks or not from target BSS via transparent container.

A first version of this embodiment of the present invention involves having two parts in a target BSS to source BSS transparent container. The first part of the container includes PS HO COMMAND message in CSN.1 code in an octet string. The second part of the container includes the number of PSI/SIs, type and PSIs or SIs in BSSGP code in an octet string. According to this version, an approved RRC message (HANDOVER FROM UTRAN COMMAND) can be used. Also, no RIM/NACC is needed. The SRNC will always get PSI/SIs in time during PS HO. The SRNC has to interpret the BSSGP command, because only "Number of SI/PSI," "Type" and "SI/PSI" are needed in RRC message.

In 3GPP TS 25.413, a change could be made as shown in FIG. 2. And, in 3GPP TS 48.018, changes could be made as shown in FIG. 3, which illustrates an information element including information needed in the Source BSS to execute a PS Handover. FIG. 4 further explain the content of FIG. 3. FIG. 4a shows a change to 3GPP TS 48.018, Section 11.3.63.2.1, Table 11.3.63.2.1a.

According to FIG. 4a, A RAN-INFORMATION application container for the NACC application has coding of the Application Container IE within the RAN-INFORMATION RIM container for the NACC application. The reporting Cell Identifier is a field that is encoded as the Cell Identifier defined in sub-clause 11.3.9 of 3GPP TS 48.018.

FIG. 4b shows a change to 3GPP TS 48.018, Section 11.3.63.2.1, Table 11.3.63.2.1b. The TYPE field indicates the type of SI/PSI messages provided by the reporting cell. The TYPE field is coded as shown.

FIG. 4c shows a change to 3GPP TS 48.018, Section 11.3.63.2.1, Table 11.3.63.2.1c. Accordingly FIG. 4c shows a number of SI/PSI coding. This field indicates the number of SI/PSI provided by the reporting cell contained in the SI/PSI field. This number may be zero. For system information messages with multiple instances, each instance is counted as one SI/PSI message. The Number of SI/PSI field is coded as shown. The SI/PSI field contains a list of either system information or packet system information messages valid for the reporting cell. The number of (packet) system information messages is indicated in the Number of SI/PSI field. Furthermore, if the TYPE field indicates that "SI messages as specified for BCCH (3GPP TS 44.018) follow" then the SI/PSI field contains System Information message instances encoded for BCCH as specified in 3GPP TS 44.018. Each System Information message contains the Message type octet followed by all the IEs composing the message payload. Each message is 21 octets long. If the TYPE field indicates that "PSI messages as specified for PBCCH (3GPP TS 44.060) follow" then the SI/PSI field contains Packet System Information message instances encoded for PBCCH as specified in 3GPP TS 44.060. Each Packet System Information message contains the MESSAGE_TYPE field followed by the PSI message content. Each message is 22 octets long.

A second version of this embodiment of the present invention involves having many parts in a target BSS to source BSS transparent container. The first part of the container includes how many blocks it has, as an integer (2 to 11). The second part of the container includes PS HO COMMAND message in CSN.1 code, in an octet string. The third part to the nth part of the container include the PSIs or Sis, in BSSGP code in an octet string; i.e., one of these n parts contains one PSI or SI. No RIM/NACC is needed. The SRNC will always get PSI/SIs in time during PS HO. Blocks are transparent to the SRNC, and the SRNC only needs to read the number of blocks. Then it just copies the content into a GSM message list IE in HANDOVER FROM UTRAN COMMAND in the RRC.

To accommodate this version of the invention, a GSM message list must be extended to cover a maximum of eleven (11) GSM messages, and the UE must distinguish whether PSIs or SIs are included. Thus, a RRC change request (CR) is needed, in order to remove PSI/SI choice IE in HANDOVER FROM UTRAN COMMAND message, in addition to a RANAP change request and a BSSGP change request.

FIG. 5 shows a change to 3GPP TS 25.413, section 9.2.1, describing a target BSS to source BSS transparent container, according to a second version of an embodiment of the present invention.

FIG. 6 shows another change to 3GPP TS 48.018, Table 11.3.80.a, describing a target BSS to source BSS transparent container coding, according to the second solution of the present invention. This information element contains the information needed in the Source BSS to execute a PS handover, and the element coding is as shown in FIG. 6. The SI/PSI field contains a list of either system information or packet system information messages valid for the reporting cell. The number of (packet) system information messages is indicated in the Number of SI/PSI field specified above. Furthermore, if the Type field indicates that "SI messages as specified for BCCH (3GPP TS 44.018) follow" then the SI/PSI field contains System Information message instances encoded for BCCH as specified in 3GPP TS 44.018. Each System Information message contains the Message type octet followed by all the IEs composing the message payload. Each message is 21 octets long. If the Type field indicates that "PSI messages as specified for PBCCH (3GPP TS 44.060) follow" then the SI/PSI field contains Packet System Information message instances encoded for PBCCH as specified in 3GPP TS 44.060. Each Packet System Information message then contains the MESSAGE_TYPE field followed by the PSI message content. Each message is 22 octets long.

Turning now to FIG. 7, a method 700 is shown according to an embodiment of the invention. An indication is provided 705 indicating whether or not SI/PSI is requested from a PS handover target via transparent container. No such request is made if the SRNC is a CRNC that implements RIM/NACC. If the indication requested the PSI/SI, then that is received 720 in a target to source transparent container. A relocation command is received 725 with the SI/PSI. Then at least part of the contents of the target to source transparent container is sent 730 to a user equipment (e.g. mobile device).

Figure 8:
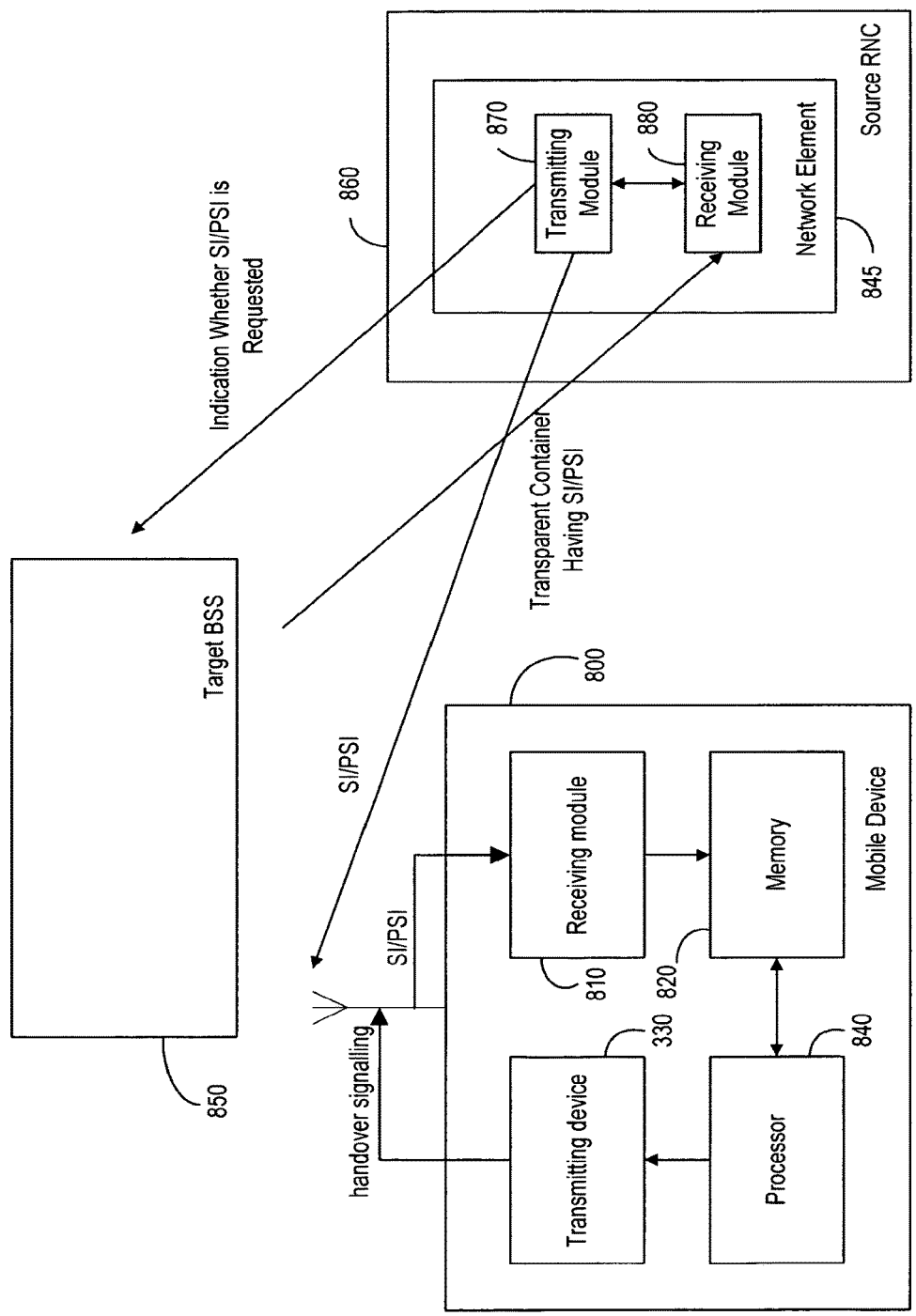
FIG. 8 is a block diagram showing a system according to an embodiment of the present invention.

A system for implementing this type of method is shown in FIG. 8. A source RNC 860 (e.g. an SRNC) includes a network element 845 which includes a transmitting module 870 and a receiving module 880. The source RNC sends an indication to a target BSS 850 as to whether SI/PSI is requested. If so, the SI/PSI is provided from the target BSS 850 to the source RNC 860. The source RNC then provides SI/PSI to a mobile device 800, which is received by a receiving module 810 of the mobile device, and is stored in a memory 820. Then a processor 840 can access that SI/PSI in order to have a transmitting device 830 perform handover signalling.

The embodiments described above can be implemented using a general purpose or specific-use computer system, with standard operating system software conforming to the method described herein. The software is designed to drive the operation of the particular hardware of the system, and will be compatible with other system components and I/O controllers. The computer system of this mobile device embodiment includes the CPU processor 840, comprising a single processing unit, multiple processing units capable of parallel operation, or the CPU can be distributed across one or more processing units in one or more locations, e.g., on a client and server. Memory 820 may comprise any known type of data storage and/or transmission media, including magnetic media, optical media, random access memory (RAM), read-only memory (ROM), a data cache, a data object, etc. Moreover, similar to the CPU, the memory may reside at a single physical location, comprising one or more types of data storage, or be distributed across a plurality of physical systems in various forms. The computer system for the network element 845 has a similar description, as a person skilled in the art will understand.

It is to be understood that the present figures, and the accompanying narrative discussions of best mode embodiments, do not purport to be completely rigorous treatments of the method, system, mobile device, and software product under consideration. A person skilled in the art will understand that the steps and signals of the present application represent general cause-and-effect relationships that do not exclude intermediate interactions of various types, and will further understand that the various steps and structures described in this application can be implemented by a variety of different sequences and configurations, using various different combinations of hardware and software which need not be further detailed herein.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A method performed by a network element comprising:
    in a source base station subsystem (BSS) to target BSS transparent container information element (IE), providing a value in a packet system information/system information (PSI/SI) indicator IE as an indication of whether a source radio network controller requests to receive packet system information from a target BSS, wherein no request is made if the source radio network controller is a controlling radio network controller that implements Radio Access Network Information Management procedure with Network Assisted Cell Change (RIM/NACC);
    receiving the packet system information in a target BSS to source BSS transparent container IE of a handover message if the indication is a request to receive the packet system information; and
    not receiving the packet system information in the target BSS to source BSS transparent container IE absent the indication requesting to receive packet system information.

2. The method of claim 1, wherein the handover message is a HANDOVER COMMAND message.

3. The method of claim 1, wherein the handover message is a packet switched (PS) HANDOVER message.

4. The method of claim 1, further comprises providing the packet system information to a mobile device.

5. The method of claim 1, wherein the packet system information includes information required by a mobile device for a packet switched handover.

6. The method of claim 5, wherein the packet switched handover is a handover to a different radio access technology than a radio access technology which the mobile device is currently using.

7. The method of claim 5, wherein the packet switched handover is a handover to a different BSS than a current BSS that the mobile device is currently using.

8. The method of claim 1, wherein the network element is a radio network controller.

9. A network element comprising:
    a transmitting module configured to provide, in a source base station subsystem (BSS) to target BSS transparent container information element (IE), a packet system information/system information (PSI/SI) indicator IE including a value as an indication of whether a source radio network controller requests to receive packet system information from a target BSS;
    a receiving module configured to receive the packet system information in a target BSS to source BSS transparent container IE of a handover message if the indication is a request to receive the packet system information, wherein no request is made if the source radio network controller is a controlling radio network controller that implements Radio Access Network Information Management procedure with Network Assisted Cell Change (RIM/NACC); and
    not receiving the packet system information in the target BSS to source BSS transparent container IE absent the indication requesting to receive packet system information.

10. The network element of claim 9, wherein the handover message is a HANDOVER COMMAND message.

11. The network element of claim 9, wherein the handover message is a packet switched (PS) HANDOVER message.

12. The network element of claim 9, wherein the network element is further configured to provide the packet system information to a mobile device.

13. The network element of claim 9, wherein the packet system information includes information required by a mobile device for a packet switched handover.

14. The network element of claim 13, wherein the packet switched handover is a handover to a different radio access technology than a radio access technology which the mobile device is currently using.

15. The network element of claim 13, wherein the packet switched handover is a handover to a different BSS than a current BSS that the mobile device is currently using.

16. The network element of claim 9, wherein the network element is a radio network controller.

* * * * *